United States Patent

[11] 3,581,937

| [72] | Inventors | Robert T. Johnson;<br>Gaylord W. Brown; Bradley A. Schnepp, Beaverton; Gary A. Adams, Coleman, all of, Mich. |
|---|---|---|
| [21] | Appl. No. | 762,424 |
| [22] | Filed | Sept. 25, 1968 |
| [45] | Patented | June 1, 1971 |
| [73] | Assignee | Koehring Company, Milwaukee, Wis. |

[54] NESTED STACK SEPARATING MECHANISM
13 Claims, 3 Drawing Figs.

[52] U.S. Cl. .................................................. 221/290, 221/259
[51] Int. Cl. ...................................................... B65g 59/10
[50] Field of Search .......................................... 221/259, 277, 271, 289, 290, 297, 298; 214/8.5 K, 8.5

[56] References Cited

UNITED STATES PATENTS

| 740,159 | 9/1903 | Mills | 221/271X |
| 1,168,652 | 1/1916 | Krema | 221/271X |
| 2,841,938 | 7/1958 | Speroni | 221/297X |
| 3,407,965 | 10/1968 | Kuhlman | 221/210 |

FOREIGN PATENTS

| 489,418 | 7/1938 | Great Britain | 221/290 |

Primary Examiner—Stanley H. Tollberg
Assistant Examiner—David A. Scherbel
Attorney—Learman & McCulloch ABSTRACT: Mechanism for separating individual, tapered rimless container parts in timed sequence from a vertical stack of such parts and wherein separable support fingers underlie the peripheral edge of the lowermost part and a continuously revolved actuator controls a spring-powered striker member which is periodically released to engage the fingers with sufficient momentum to spread them enough to let the lowermost part fall beyond the fingers which are then immediately returned to original position to underlie and receive the also descending next lowermost part.

INVENTOR
ROBERT T. JOHNSON
GAYLORD W. BROWN
BRADLEY A. SCHNEPP
GARY A. ADAMS
BY
*Learman & McCulloch,*
*their attorneys*

INVENTOR.
ROBERT T. JOHNSON
GAYLORD W. BROWN
BRADLEY A. SCHNEPP
GARY A. ADAMS
BY their attorneys
Learman & McCulloch

NESTED STACK SEPARATING MECHANISM

One of the prime objects of the present invention is to provide mechanism which is capable of effecting the high-speed separation of rimless container parts from the bottom of a stack in a highly efficient and reliable manner, although it is to be understood that the apparatus may also be used to dispense containers or other parts having rims. The separation of nested rimless parts is, however, a far more difficult operation and the present apparatus is particularly designed for that purpose.

A further object of the invention is to provide apparatus which operates continuously to dispense container parts or like articles from the bottom of a nested stack in a timed sequence which enables the mechanism to supply parts to other processing machines, such as container part joining machines, in such quantity as to satisfy their high production requirements.

Still a further object of the invention is to design relatively simple and inexpensive separating mechanism of the character described wherein separable support fingers are only momentarily spread to let the lowermost part fall and are immediately returned to original position to underlie and receive the stack once again.

Other objects and advantages of the invention will be pointed out specifically or will become apparent from the following description when it is considered in conjunction with the appended claims and the accompanying drawings, in which:

FIG. 1 is a top plan view of the mechanism, with the chain lines indicating a separated position of the stack-supporting fingers and also illustrating the manner in which a cam member moves a spring-biased striker member to a removed position prior to releasing it so that it is brought sharply into engagement with the fingers with enough momentum to momentarily spread the fingers and release only the lowermost container from the stack;

Figure 1:
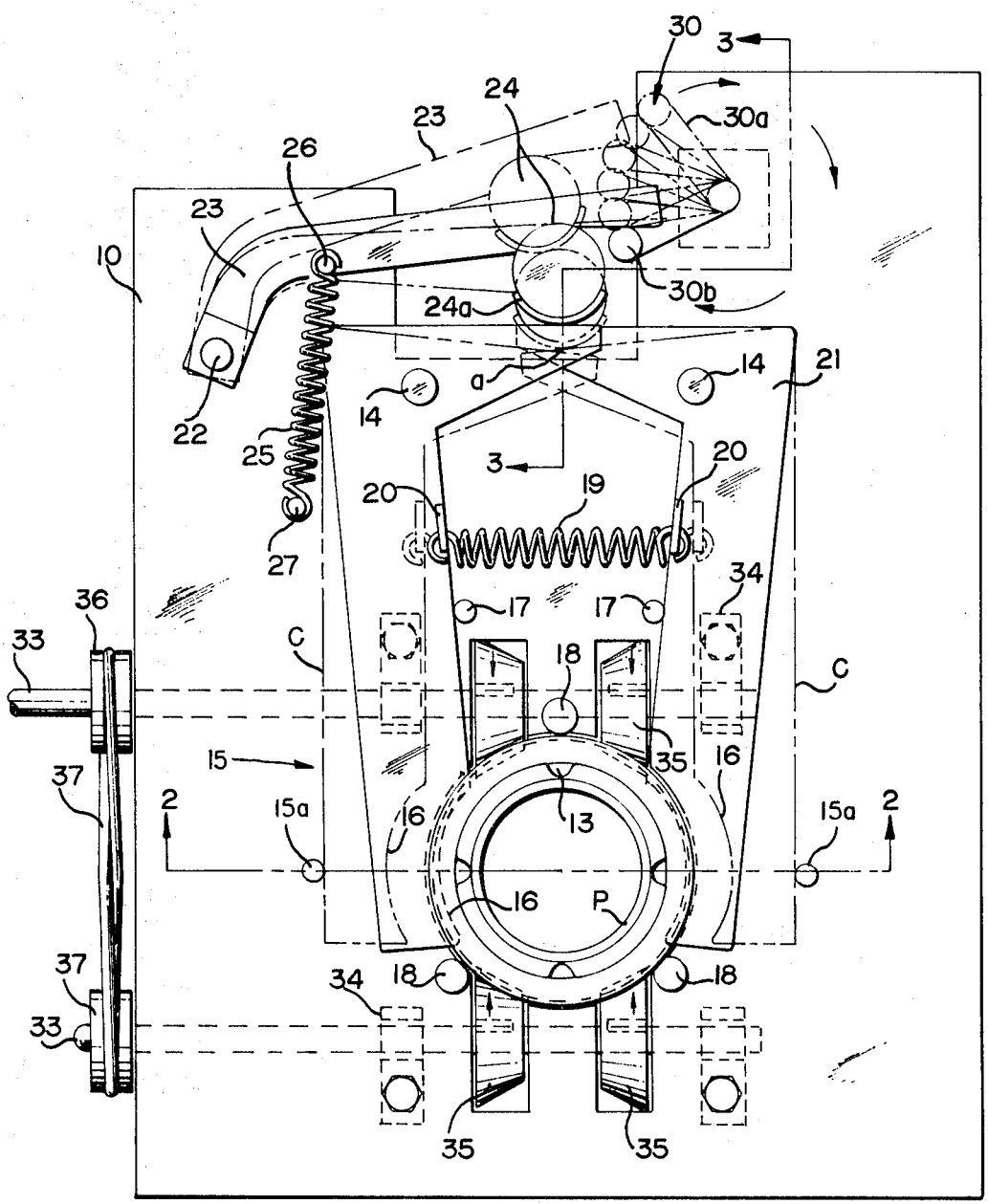

Referring now more particularly to the accompanying drawings, in which we have shown a preferred embodiment of the invention only, a letter F generally indicates the frame of the machine, which includes a top plate 10 having a dispensing opening 11 therein through which the individual container parts P are individually dispensed to a discharge conveyor 12. The particular parts P which are being handled are the annular, thin-walled, flexible, organic plastic container parts which, when supplied with bottom and top closure parts, form a container. Preferably, the parts P are joined with top and bottom container parts by a spin welding process utilizing the spin welding machinery described in U.S. Pat. No. 3,297,504, and it may be considered that the conveyor 12 is an endless belt conveyor which delivers the individual container parts P to the spin welding machine. Alternatively, the surface 12 could be an accumulating table of known design over which a plurality of stack-separating mechanisms of the character to be described are employed to simultaneously release a plurality of lowermost container parts from a plurality of nested stacks through a multitude of opens 11 in top plate 10.

Figure 2:
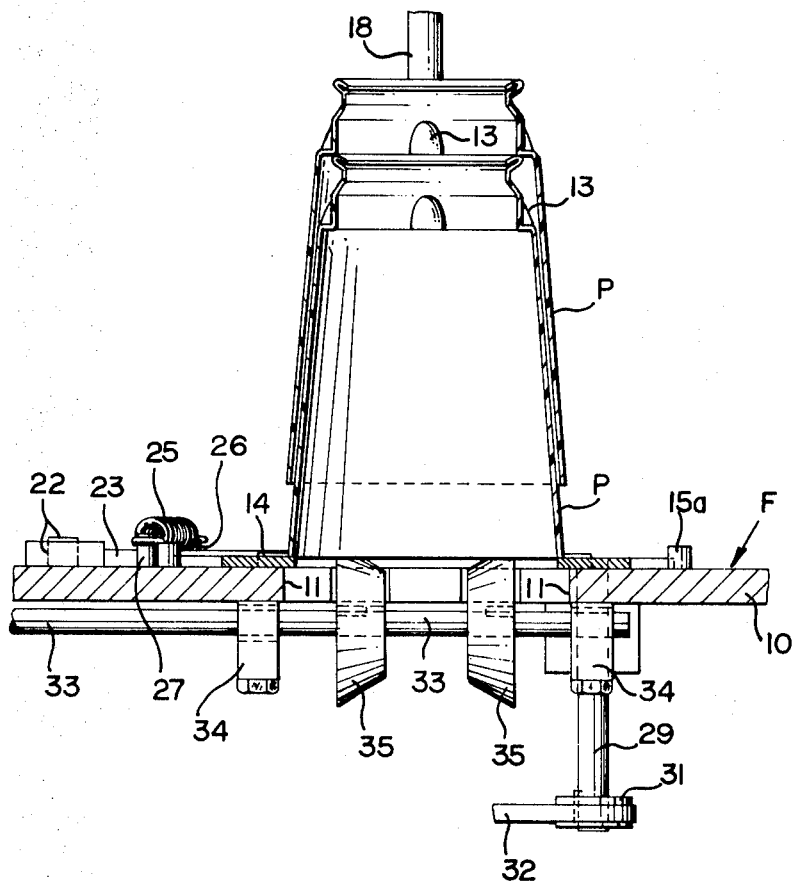
FIG. 2 is a transverse sectional view taken on the line 2—2 of FIG. 1.

As FIG. 2 particularly indicates, the container parts P taper inversely in the sense that they progressively widen toward their lower ends. As shown, they are provided with stacking ribs or abutments 13 which hold them in a controlled, vertically stacked condition in which they are spaced a predetermined vertical distance one from the other. Stacking ribs of this character are, of course, conventionally used to prevent a snug telescoping or nesting of parts which would make it difficult to remove individual container parts from the stack. As shown, the ribs 13 are provided near the upper ends of the annular parts P, in sidewalls which taper uniformly downwardly, as shown, to their lower ends.

Pivotally mounted on pins 14 mounted by the top plate 10 are the pair of bellcrank-shaped, separable support fingers generally designated 15 which have, at their front ends, curvilinear container part supporting inner edge portions 16 as shown. The edge portions 16 are configured to conform to the curvature of the container parts P and when the fingers 15 are in their inward or most closed position, as determined by stop pins 17 (see FIG. 1), underlie and support the peripheral edge of the lowermost container part P as shown in both FIGS. 1 and 2. The container parts P are supplied to the mechanism in any suitable manner and are guided to a properly stacked position relative to the dispensing opening 11 by a series of vertically extending guide rods 18 mounted on the plate 10. The fingers 15 are normally biased to the supporting position in which they are shown in FIGS. 1 and 2 in solid lines by a coil spring 19 connected between upstanding lugs or flanges 20 provided on the fingers 15. At their rear ends, the fingers 15 are provided with overlapping arm portions 21, the arm portion 21 on the finger 15 at the left in FIG. 1 being bent upwardly, as shown, so that it lies in a plane above the arm 21 of the right finger 15 and does not interfere with movement thereof. Together, the two vertically lapped arms 21 form a composite target generally designated $a$ and, when struck a sharp blow, function to momentarily spread the fingers 15 sufficiently to release the lowermost part P before returning to original position to catch or receive the next lowermost part P in a manner which will be described. The spread of fingers 15 is limited by pins 15a on the plate 10 which are disposed in the path of fingers 15.

Pivotally mounted on a pin or post 22 on the plate 10 is a striker member 23 having a cylinder member 24 secured at one end, as shown, which is covered at one side by a resilient pad 24a. The pad 24a may be formed of natural or synthetic rubber of suitable durometer and functions as a cushion to prevent direct contact of the metal parts 24 and 21. The striker 23 is normally biased to a position of engagement with the overlapped ends 21 of the fingers 15 by a coil spring 25 secured to a pin 26 on the arm 23 and a pin 27 on the plate 10, but it should be understood that the spring 25 does not exert sufficient force by itself to spread the fingers 15 from the position in which they are shown in FIG. 1. In other words, the spring 19 is sufficiently strong to hold the fingers 15 in the inward or closed position shown in FIG. 1, despite the spring 25 which, as mentioned, maintains the striker 23 normally in engagement with the ends 25.

Journaled in a bushing 28 supported by the plate 10 is a rotary actuator shaft 29 mounting a cam actuator 30 which comprises a crank arm 30a and a striker arm engaging cylinder 30b. The shaft 29 is continuously revolved at a predetermined speed by a pulley 31 driven by a belt 32 from any conventional motive source. Preferably, the same electric motor which drives the shaft 29 will also drive shafts 33 journaled in bearings 34 dependent from the plate 10 and on which rubber part-engaging rollers 35 are keyed as shown. As FIG. 1 indicates, one of the shafts 33 is driven and mounts a pulley 36 which drives a pulley 37 on the other shaft 33 via a belt 38.

Figure 3:
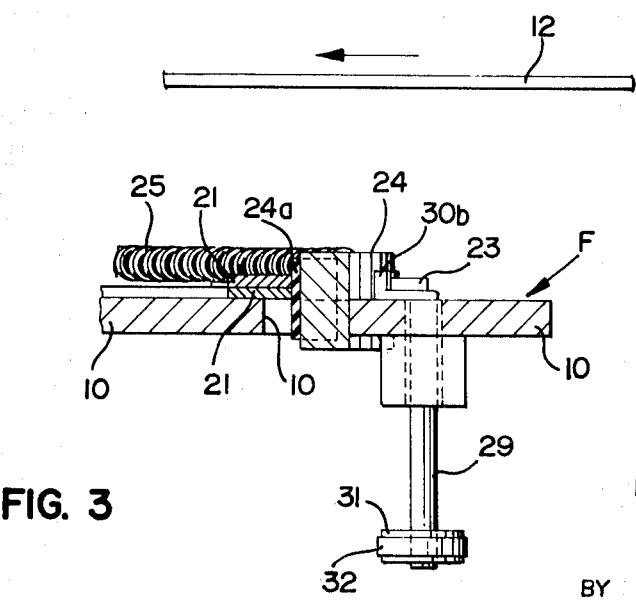
FIG. 3 is a sectional elevational view taken on the line 3—3 of FIG. 1.

In operation, with the various parts of the mechanism shown in the solid line positions, as in FIGS. 1—3, a dispensing actuation is effected when the cam actuator part 30b in its continuous clockwise travel in FIG. 1 engages the striker 23 and moves it to the outward position indicated by the chain lines at $b$ in FIG. 1. As the actuator 30 moves beyond the striker 23 and releases it, the arm 23 is free to return inwardly under the force of the energy obtained by extending the spring 25 and the cylinder 24 sharply engages the ends 21 of fingers 15 with sufficient momentum to spread them to the outer positions shown at $c$ in FIG. 1. With support edge surfaces 16 thus removed, the lowermost part P drops through the opening 11 and is immediately engaged by the tapered rollers 35 which move it rapidly downwardly to the surface 12 at a speed faster than the part P would move if solely moving under the forces of gravity. The shafts 33 are oppositely rotated and are of sufficiently soft material to grip the parts P and move them sharply downwardly. When the momentum of striker 23 is dissipated, the spring 19 sharply returns the fingers 15 to the initial position shown in solid lines in time to receive the next lowermost part P which, of course, has been descending under the influence of gravity forces. About the time that the next succeeding part P is received, the actuator 30 has revolved around to a point where it again engages the striker 23 and the operation repeats until all parts P are unstacked. The shafts 29 and 33 must, of course, be driven at predetermined rates correlated with the position of the ribs 13 so that a synchronized, properly timed, high-speed operation is achieved.

It is to be understood that the drawings and descriptive matter are in all cases to be interpreted as merely illustrative of the principles of the invention, rather than as limiting the same in any way, since it is contemplated that various changes may be made in the various elements to achieve like results without departing from the spirit of the invention or the scope of the appended claims.

We claim:

1. Mechanism for separating individual, tapered, container parts in timed sequence from a vertical stack of such container parts comprising: separable support fingers normally biased to a position in which they underlie opposing edge portions of the lowermost part to prevent the free fall of the lowermost part; and finger-spreading means including striker means, mounted adjacent said fingers, and movable from a first position remote from said fingers to a second position in striking engagement therewith for abruptly, momentarily spreading the fingers enough to let the edge portions of the lowermost part fall beyond the fingers; and means for immediately returning said fingers to their original position to underlie and receive the also descending next lowermost part.

2. The combination defined in claim 1 in which container part travel accelerating means is mounted at a spaced distance below said fingers to move a released part downwardly at a speed greater than it would free fall.

3. The combination defined in claim 1 wherein means normally biases said striker means to move toward said second position; and means is provided for moving said striker means to said first position against said bias and then releasing said striker means abruptly.

4. The combination defined in claim 3 in which said means for moving said striker means comprises continuously driven rotary cam means 5. The combination defined in claim 3 in which said fingers are pivotally mounted bellcranks, one of which has an end overlying a like end of the other; and said striker means comprises a lever pivotally mounted to swing in a path to strike said ends simultaneously and pivot said bellcranks to release a part.

6. The combination defined in claim 5 in which said striker-biasing means comprises a spring connected to urge said lever against said ends; and spring means is connected between said fingers to bias them toward their more closed position with a force greater than the bias exerted to spread them by the striker-biasing means when the striker is at rest in engagement with said ends.

7. The combination defined in claim 6 in which stop means in path of said fingers limits the travel of said fingers in both directions.

8. Apparatus for separating individual, tapered, hollow container parts or the like, which are disposed in a vertically nested stack, from the underside of the stack, comprising: part edge support means movable from a position underlying an edge of the undermost part to a nonunderlying position; striker means mounted adjacent said support means for movement from a position remote from the part edge support means to a striking position for continuously, and cyclically, momentarily moving said support means to said nonunderlying position to abruptly release the lowermost part and permit the undermost part edge to fall below said support means; and means for immediately returning said part edge support means to said underlying position to receive the stack once again.

9. The combination defined in claim 8 in which spring means is connected to power said striker means.

10. The combination defined in claim 8 in which tapered roller means is mounted at a spaced distance below said part edge support means in position to receive a released part and impart a downward movement thereto.

11. Apparatus for separating individual, tapered, hollow container parts or the like, which are disposed in a vertically nested stack, from the underside of the stack, comprising: part edge support means movable from a position underlying an edge of the undermost part to a nonunderlying position; means for continuously, and cyclically, momentarily moving said support means to said nonunderlying position to release the lowermost container part and permit the undermost part edge to fall below said support means and returning said support means to said underlying position to receive the stack once again; opposed cooperating, independently movable drive members for engaging opposed outer side surfaces of a released container part; and power means mechanically coupled to said drive members for independently driving said drive members in downward paths of travel to impart downward movement to said released container part.

12. Apparatus as set forth in claim 11 wherein said drive members are continuously driven.

13. Apparatus as set forth in claim 11 wherein said independently movable drive members comprise opposed drive rolls.